Feb. 23, 1971 W. S. FREEMAN 3,566,286

SYSTEM FOR DETERMINING THE GAIN COMPRESSION
OF AN R.F. AMPLIFIER
Filed April 21, 1969

William S. Freeman, DECEASED,
BY Patricia C. Paylor, EXECUTRIX
INVENTOR

BY Robert C. Sims 3,566,286

SYSTEM FOR DETERMINING THE GAIN COMPRESSION OF AN R.F. AMPLIFIER

William S. Freeman, deceased, late of Reading, Pa., by Patricia C. Paylor, executrix, Charlotte, N.C., assignor, by mesne assignments, to the United States of America as represented by the Secretary of the Army

Filed Apr. 21, 1969, Ser. No. 818,202
Int. Cl. G01r *17/00, 17/14*
U.S. Cl. 330—2 7 Claims

ABSTRACT OF THE DISCLOSURE

Two loops are provided for the testing of the R.F. amplifier; one through variable fore and aft ganged attenuators and the amplifiers to one side of a ratio or difference meter; and another loop through the attenuators, an isolator and another side of the ratio meter. This is accomplished alternately by a pair of switching devices and a coupler. In this way the meter reading will not be subjected to any errors presented by the attenuators.

BACKGROUND OF THE INVENTION

This invention is related to the field of testing. Specifically, the testing of the gain compression of a microwave transistor amplifier. Gain compression of an amplifier occurs when the amplifier is driven into saturation and is characterized by its output power level failing to increase linearly with an increase in power input. Amplifiers having a gain compression that is in excess of 0.1 db are classified as unacceptable. Since the power output of an R.F. amplifier is a function of the power input and the gain of the amplifier, the input and the output power levels of the amplifier must be attenuated equal amounts in opposite directions to determine the gain compression of the amplifier for particular values of power output. However, the errors introduced in effecting an equal and opposite attenuation of the input and output power level of the amplifier have been found to be greater than the 0.1 db gain compression level which is to be measured. Therefore, there is a definite need for the present invention which minimized these errors and allows needed accuracy of measurement at a reasonable cost.

SUMMARY OF THE INVENTION

The R.F. amplifier to be tested has its input connected to a first output of an oscillating two position switch and its output connected to a coupler. The other output of the switch is connected through an isolator to the same coupler. A signal generator feeds the input of the switch by way of a first variable attenuator. The coupler is connected through a second variable attenuator and an amplifier to the input of a second oscillating two position switch. A voltage standing wave ratio meter is coupled through a detector to the output of this last named amplifier. Said first and second variable attenuators are ganged together and are varied so that as the first attenuator is decreased, the second attenuator is increased by the same amount. Said first and second switches being controlled by a single oscillator so that they will switch their respective outputs to their inputs at the same time. Said switches operate similarly to a multivibrator, and may be such. A first output of said second switch being connected through a detector to one side of a signal ratio (or difference) meter. The other side of said second switch being connected through another detector to the other side of said ratio meter. Since the ratio meter will read the difference between the signals from the two loops, any errors introduced by the ganged attenuators would cancel out. The voltage standing wave ratio meter is only used to balance the system before a test is carried out. The VSWR meter will indicate a null when there is a balance between the amplitudes of the first and second loops. This balance is brought about by adjustment of an independent attenuator which is connected between the amplifier to be tested and the coupler. Once the null reading is obtained, the setting on the independent attenuator is not changed for the test. In the test the second switch causes test and reference signals to be imposed upon opposite sides of the ratio meter. The test and reference signals are alternately sent to the meter on opposite cycles of the switches. As the ganged attenuators are varied to change the signal level through the test amplifier, any variation in the ratio of the test and reference signals indicates gain compression. Since the test and reference signals both pass through the attenuators, any failure of the attenuators to track properly will be applied to both signals, and its effect will be canceled out because the ratio meter measures the ratio (or difference) of the two signals. In other words, any change in the output of the test signal due to errors of the attenuators will be matched by a corresponding change in the reference signal.

DESCRIPTION OF THE PREFERRED EMBODIMENT

Figure 1:
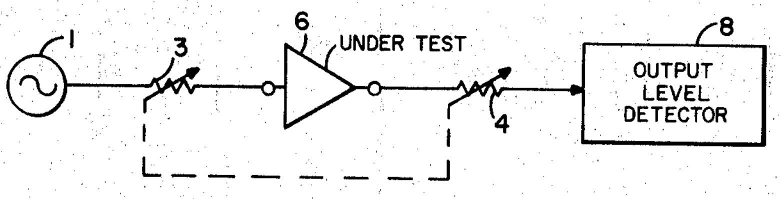
PRIOR ART FIG. 1
FIG. 1 is a block diagram of a prior art gain compression measuring system.

FIG. 1 shows a prior art system of determining the gain compression of a radio frequency amplifier. Gain compression in a high frequency amplifier occurs when the amplifier is driven into saturation. When this happens, the output power level of the amplifier will not increase linearly with an increase in its input power. In FIG. 1 a signal from a signal generator 1 is applied to a first variable attenuator 3 of a pair of ganged variable attenuators 3 and 4. The amplifier 6 to be tested is connected between the pair of attenuators and receives the attenuated signal from attenuator 3, amplifies it, and sends the amplified signal on to the second attenuator 4. An output level detector 8 is connected to the second attenuator and receives and measures the attenuated amplified singal. The pair of attenuators 3 and 4 are ganged together and are varied so that as the first attenuator is decreased the second attenuator is increased by the same amount. A decrease in the reading of detector 8 should indicate gain compression of amplifier 6. However, the two attenuators 3 and 4 must vary at exactly the same rate or an error due to their tracking will be introduced into the measurement.

Figure 2:
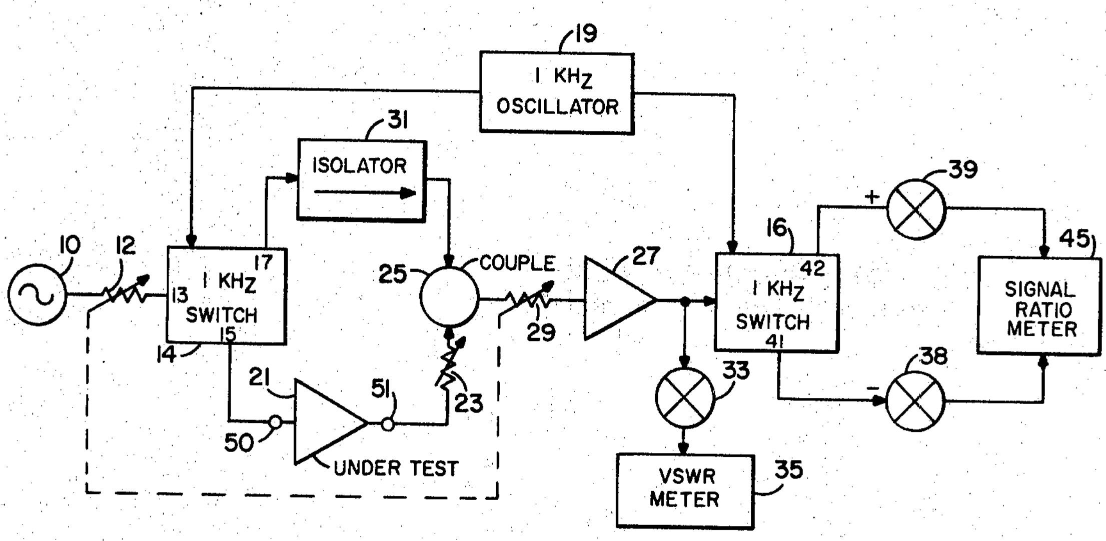
FIG. 2 is a block diagram of a preferred form of a gain compression measuring system employing the basic concept of the invention.

FIG. 2 shows the present invention which will give a true indication of the amount of gain compression of an R.F. amplifier in spite of any tracking errors by the ganged attenuators. An input R.F. signal is generated by a single frequency generator 10 (a swept frequency generator could also be used) and is coupled through a variable attenuator 12 to the input port of a free-running synchronized 1 kHz. switch 14. Switch 14 is synchronized with switch 16 and each switch operates similarly to a multivibrator so as to switch R.F. power between output ports 15 and 17. These switches are controlled by a 1 kHz. oscillator 19 and may take the form of a two position switch controlled by a coil which in turn is controlled by oscillator 19.

The R.F. amplifier 21 (or any conventional amplifier) to be tested has its input connected to output port 15 of switch 14 so as to receive the signals from generator 10 on alternate half cycles of the switching frequency. The output of amplifier 21 passes through variable attenuator 23 to coupler 25. The value of attenuator 23 is set such as to have a loss value that is matched to the gain of the amplifier to be tested. The output of coupler 25 combines the signals and is connected to the input of an amplifier 27 by way of a second variable attenuator 29. Attenuator 29 is ganged to track with attenuator 12 so that an increase in signal attenuation by one attenuator produces a corresponding decrease in the signal attenuation by the other attenuator. Therefore, attenuators 12 and 29 respectively establish the input and output power levels to the amplifier under test.

Output port 17 of switch 14 feeds the signal from generator 10 to isolator 31 the other alternate half cycles of the switching frequency. Isolator 31 may be a ferrite isolator which provides isolation between the reference signal (through port 17) and the test signal (through port 15). Also, isolator will provide a VSWR match between these two signals. The reference signal passes through isolator to coupler 25. The combined test and reference signal that is applied to the output of coupler 25 is first attenuated by attenuator 29 and then amplified by amplifier 27. Amplifier 27 is provided to amplify the attenuated signals to a noise-free detectable level. Amplifier 27 may, of course, be omitted if the attenuated signal level is high enough. The output of amplifier 27 is coupled through an R.F. coupler, not shown, to a signal detecting crystal 33. A VSWR indicator 35 detects nulls in the output of crystal 33.

Detector 33 and VSWR indicator 35 are normally used only once during a test cycle to establish a reference power output level for the amplifier under test. This output level is obtained by adjusting variable attenuator 23 until a null output signal is indicated by the VSWR meter. Such a null is indicative of a balance between the amplitudes of the test signal and the reference or calibrating signal.

The output of amplifier 27 is further connected to the input port of switch 16. A pair of matched R.F. diodes 38 and 39 of opposite polarity are coupled to the ports 41 and 42 of switch 16. Switch 16 separates the combined test and reference signals at its outputs. The negatively polarized diode detector 38 inverts the test signal so that both test and reference are in-phase and of opposite polarity as they are received by a signal ratio meter 45. The signal ratio meter 45 provides an indication as to the difference in amplitude levels between the test and reference signals. The meter could be any of the known ratio meters, and could take the form of differential amplifier connected to a meter for measuring amplitude of the output of the diefferential amplifier. The signal ratio meter may be calibrated in decibels so that the gain compression in decibels may be read off directly.

To better understand the invention, a description of the operation of the preferred embodiment is now presented: The amplifier to be tested is connected between terminals 50 and 51. This amplifier may be a microwave transistor amplifier which is to have its gain compression level measured. An input R.F. signal from generator 10 is applied to an input terminal of attenuator 12. The attenuated signal from the output of attenuator 12 is split into two paths by switch 14. The first path is the test path which is through the test amplifier and attenuator 23 to an input of coupler 25 and produces the test signal. The second path is the reference path through isolator 31 to another input of coupler 25 and produces the reference signal. The signal goes through these paths alternately on opposite cycles of the switch 14. The signals alternate at 1 kHz. (the switching rate). In order to reference different possible test amplifiers to the same initial output power level, attenuator 23 is first adjusted until a null appears on meter 35; therefore, indicating that the test and the reference signals balance. These two signals are combined between coupler 25 and switch 16. The combined test and reference signals are attenuated by attenuator 29 and amplified by amplifier 27. Switch 16 samples the combined signals and separates the test signal from the reference signal. Switch 16 sends the test signal through a negative detector to one side of a ratio meter and sends the reference signal through a detector to the other side of the ratio meter. The negative detector reverses the polarity of the test signals so that the voltages presented to meter 45 are of opposite polarities. The procedure for data gathering now involves the varying of the input and output power levels of the amplifier under test by the sequential adjustment of ganged attenuators 12 and 29. Thus, assuming that the attenuator 12 initially provided 50 db of signal loss and attenuator 29 provided 20 db of signal loss, the ratio meter will read out the gain compression of the amplifier for those values of attenuation. Thereafter, the attenuators may be adjusted to provide 40 db and 30 db of loss, and the ratio meter reading observed. This attenuating process is performed throughout the rated nonlinear operating region of the amplifier under test to obtain values of gain compression throughout that nonlinear region.

The present invention minimizes errors which may be introduced by the failure of the attenuators 12 and 29 to track together precisely. This aspect of the invention will be appreciated once it is realized that both the test and reference signals are traced through a common circuit path so that they are both equally effected by a failure of one of the ganged attenuators to track precisely with the other. By measuring the ratio of the test and reference signals in the ratio meter, such nontracking errors are minimal.

While the invention has been described with reference to a preferred embodiment thereof, it will be apparent that various modifications and other embodiments thereof will occur to those skilled in the art within the scope of the invention. Accordingly, it is desired that the scope of the invention be limited only by the appended claims.

What is claimed is:

1. A system comprising first and second attenuators each having an input and an output, a signal being impressed upon the input of said first attenuator, first and second switching means, each of said switching means having an input port and first and second output ports, said output of the first attenuator being connected to said first input port of said first switch, first circuit means having an input connected to said first output port of said first switch, isolator means having an input connected to said second output port of said first switch, second circuit means connected to outputs of said first circuit means and said isolator means and to said second attenuator so as to couple these outputs to the input of said second attenuator, third circuit means connecting the output of said second attenuator to said input port of said second switch, a measuring means having first and second inputs, fourth circuit means connected between said first output port of said second switch and the first input of the measuring means, and fifth circuit means connected between the second output port of the second switch and said second input of said measuring means.

2. A system set forth in claim 1, wherein said first circuit means includes an amplifier which is to be tested.

3. A system as set forth in claim 2, wherein said signal is generated by a signal generating means having an output connected to the input of said first attenuator, said first and second attenuators being variable and being ganged together such that an increase in one will cause a corresponding decrease in the other, and said switches being switched back and forth between connecting their input port to the first output port to the first output port to connecting their input port to the second ouput port in synchronism with each other.

4. A system as set forth in claim 3, wherein said second circuit means is a coupler, said third circuit means is a further amplifier, and said fourth and fifth means are closely matched first and second detectors.

5. A system as set forth in claim 4, wherein said second circuit further includes a third variable attenuator connected between an output of said amplifier to be tested and the coupler, a voltage standing wave meter connected to the output of the third circuit means so as to indicate a balance between signal coming from the amplifier to be tested and the signal coming from the isolator means, and said third attenuator initially being adjusted so as to obtain such an indication on said voltage standing wave meter.

6. A system as set forth in claim 5 wherein said measuring means is a signal ratio meter, said matched detectors being of opposite polarities so that voltages of opposite polarities are applied to the ratio meter inputs.

7. A system as set forth in claims 6, wherein said first and second switches are multivibrators, an oscillator connected to both of said switches so as to control them, said signal having a frequency in the radio frequency range, said amplier to be tested is an R.F. amplifier, and said measuring means measuring the gain compression of the R.F. amplifier as the ganged attenuators are varied in the nonlinear operating range of the R.F. amplifier to be tested.

References Cited

UNITED STATES PATENTS

| | | | |
|---|---|---|---|
| 2,618,686 | 11/1952 | De Lange | 324—57 |
| 2,857,568 | 10/1958 | Hering et al. | 324—99 |
| 3,319,165 | 5/1967 | Hamlin et al. | 324—58X |

NATHAN KAUFMAN, Primary Examiner

U.S. Cl. X.R.

324—57; 330—51, 124